UNITED STATES PATENT OFFICE.

MAX SCHLUSS, OF BREDENEY, NEAR ESSEN-ON-THE-RUHR, GERMANY.

METHOD OF PRODUCING A CAOUTCHOUC-LIKE ELASTIC SUBSTANCE.

960,116. Specification of Letters Patent. Patented May 31, 1910.

No Drawing. Application filed November 29, 1907. Serial No. 404,335.

*To all whom it may concern:*

Be it known that I, MAX SCHLUSS, engineer, a subject of the Emperor of Germany, and residing at 210 Bredeney, near Essen-on-the-Ruhr, Germany, have invented new and useful Improvements in Methods of Producing a Caoutchouc-Like Elastic Substance, of which the following is a specification.

This invention refers to an improved caoutchouc-like, elastic substance and an improved method of making the same by the well known action of chromates upon a mixture of gelatin and glue in a liquid condition.

In the practice of this invention, sulfur in the state known as flowers of sulfur, either alone or in conjunction with flaky graphite, is added to a liquid mixture of gelatin and glue treated with a chromate in accordance with the usual practice. To this mixture is preferably added, in order to prevent the product from becoming hard and dry, a solution of pure para rubber in nitrated linseed oil.

The product obtained according to the present invention is especially valuable for use in the manufacture of elastic tires for vehicles. The sulfur contained in the product acts as a vulcanizing agent for the rubber and oil, and the graphite, being a poor heat conductor, assists in counteracting the tendency of the product to become overheated when in use.

The use of artificial rubber sponge has already been proposed for the purpose of being used in the manufacture of elastic tires, etc., but this is unsuitable in the present case, as its pores are insufficient in number and fineness and because their smooth surfaces do not enter into a proper union with the filling substance. Furthermore, rubber sponge is too expensive for the purpose in question. I may add pieces of sponge to the treated glue and gelatin both for decreasing its weight, and for increasing its elasticity, fine, porous sea-sponge being preferably employed. The pores of this sponge become completely filled with the liquid substance and serve to materially increase the coherency of the mass.

The following examples show the proportions in which I prefer to employ the ingredients of my caoutchouc-like substance:

Example No. 1: To a mixture of 1000 grams of gelatin, 50 grams chromate, and 1333 grams of glue, I add 8 grams of flowers of sulfur and 5 grams of flaky graphite. The mixture is allowed to stand until it solidifies when it is ready for use.

Example No. 2: To the mixture prepared as specified in Example No. 1, I add, while it is in a liquid state, 4 grams of pure para rubber gum, dissolved in 60 grams of nitrated linseed oil.

Example No. 3: To the product of Example No. 2, I may add, while in a liquid state, one-half its bulk of fine porous sponge.

Having described my invention, I claim:

1. The herein described composition of matter for forming a caoutchouc-like, elastic substance, consisting of the following ingredients, and combined in the following proportions, to wit; 1000 grams gelatin, 1333 grams glue, 50 grams chromate, 8 grams flowers of sulfur, and 5 grams flaky graphite.

2. The herein described composition of matter for forming a caoutchouc-like, elastic substance, consisting of the following ingredients, and combined in the following proportions, to wit; 1000 grams gelatin, 1333 grams glue, 50 grams chromate, 8 grams flowers of sulfur, 5 grams flaky graphite, 4 grams para rubber, and 60 grams nitrated linseed oil.

In testimony whereof I have hereunto set my hand in presence of two subscribing witnesses.

MAX SCHLUSS.

Witnesses:
 HENRY HASPER,
 WOLDEMAR HAUPT.